J. H. BICKHARD.
CULTIVATOR SHOVEL AND FENDER.
APPLICATION FILED JAN. 4, 1909.
947,587.
Patented Jan. 25, 1910.
2 SHEETS—SHEET 1.
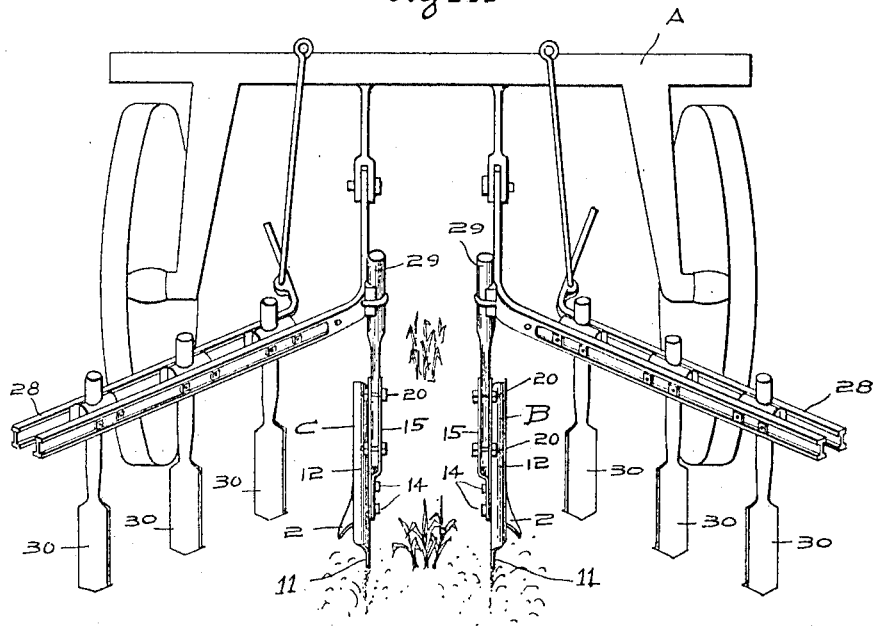
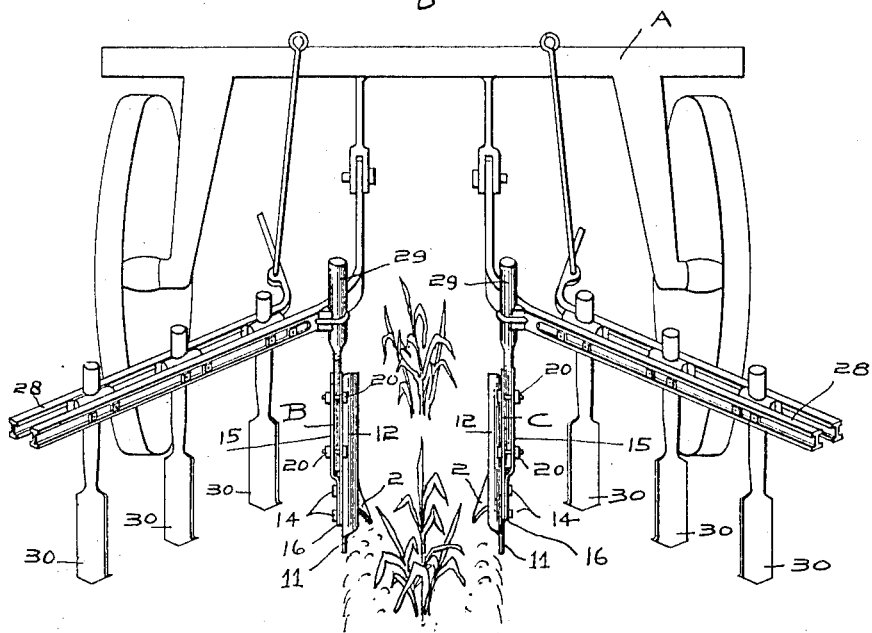

J H. BICKHARD.
CULTIVATOR SHOVEL AND FENDER.
APPLICATION FILED JAN. 4, 1909.
947,587.
Patented Jan. 25, 1910.
2 SHEETS—SHEET 2.
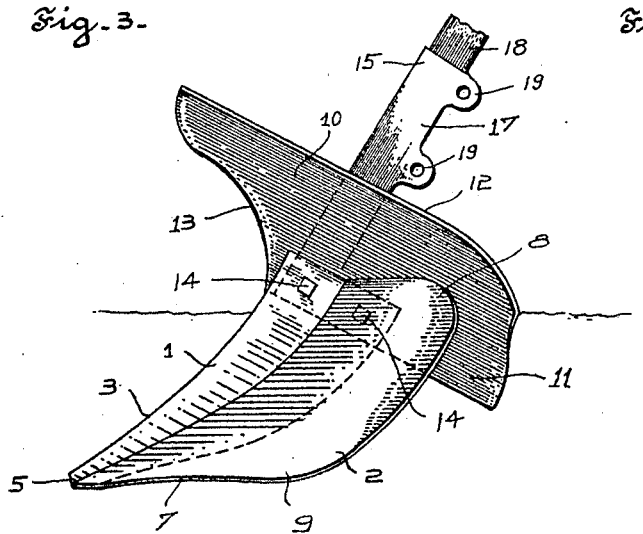
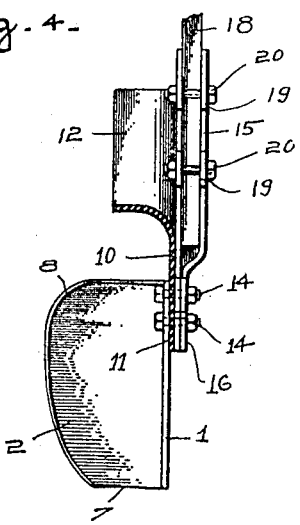
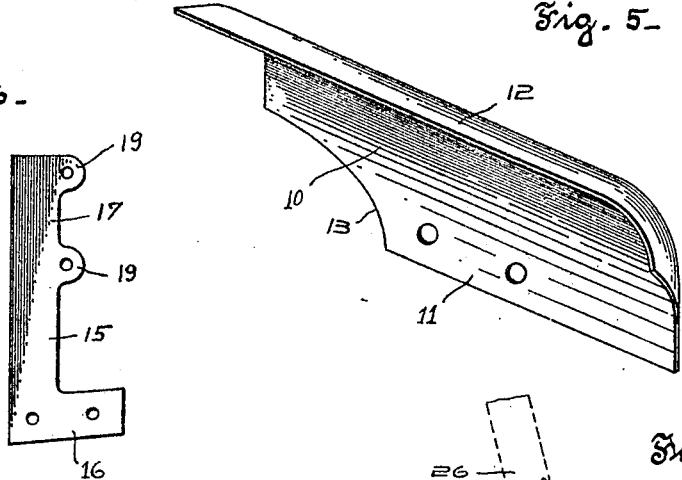
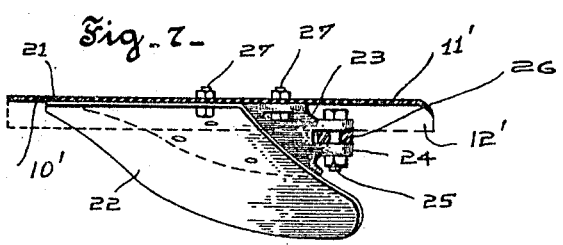
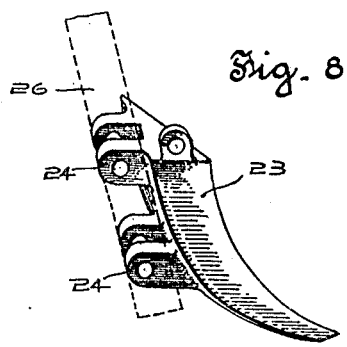
Witnesses
M. E. Harner.
E. H. Hill.
Inventor
J Henry Bickard
By Herndon H. Martin
Attorney

UNITED STATES PATENT OFFICE.

J HENRY BICKHARD, OF EVANSPORT, OHIO.

CULTIVATOR SHOVEL AND FENDER.

947,587.  Specification of Letters Patent.  Patented Jan. 25, 1910.

Application filed January 4, 1909. Serial No. 470,721.

*To all whom it may concern:*

Be it known that I, J HENRY BICKHARD, a citizen of the United States, residing at Evansport, in the county of Defiance and State of Ohio, have invented a new and useful Cultivator Shovel and Fender, of which the following is a specification.

My invention relates to cultivator fenders, and has for its object to provide an implement of the kind, which in pairs, right and left, are adapted to loosen the earth about plants in rows, and to remove weeds more closely along young plants without danger of more or less burying or covering the same with earth; furthermore, to adapt the members of the pair of cultivator fenders to be interchanged with each other relative to their position of treating young plants and in the interchanged position, be adapted to heap earth against older plants.

The objects of my invention are accomplished as hereinafter described and illustrated in the drawings in which—

Figure 1 is a perspective rear view of a cultivator equipped with my fender and associated shovel, in the position permitting the removal of weeds more closely to young plants. Fig. 2 is also a perspective rear view of a cultivator showing my fenders and the shovels arranged to heap earth against older plants. Fig. 3 is a side elevation of one of my cultivator fenders in association with a shovel. Fig. 4 is a rear view of the same showing the fender-overhang relative to the mold board and showing a method of coupling the fender, the share and mold-board together and to one of the cultivator beam standards. Fig. 5 is an isometric view of the detachable fender. Fig. 6 is a side view of a clamp member by means of which the cultivator-shovel and fender may be secured to a standard of the cultivator beam. Fig. 7 is a top plan view showing a modified construction of my cultivator shovel, in which the share and the mold-board are stamped integral. Fig. 8 is an isometric view showing the cast metal backing for the stamped metal share and mold-board.

The cultivator shovel shown comprises a share 1 and a mold-board 2, both being made to conform, more or less, to the dimensions of the usual cultivator shovels. The cutting edge 3 of the share 1 curves forward and downward to suitably dip the point 5 of the share. The mold-board 2 is preferably concaved more than the curvature of the cutting edge of the share and extends from near the point of the share in a rearwardly inclined direction and at an angle greater than the angle of the share being also arranged to extend rearward at a suitable angle from the share 1. The base 7 of the mold-board is arranged to form, for a portion of its length, a lateral continuation of the cutting edge of the share and the free top portion 8 of the mold-board is so rearwardly and inwardly curved, that a free delivery of earth over the mold-board is provided for without greatly turning the earth, in consequence of which the formation of a furrow, of more or less depth, is avoided. The bottom corner 9 of the mold-board is also suitably rounded from the base 7 to the free edge of the board.

In order to prevent clods of earth burying or covering young plants, I have provided a fender 10. The body portion of the fender is a vertical plate 11, having its top edge and a portion of its rear edge flanged to overhang the share in the direction of the mold-board to provide a ledge 12 of some width. The rear upper corner of the fender-plate is rounded, and the ledge 12 conforming to such rounding is then made to taper into the rear edge of the fender-plate. The fender is coupled to the share to line therewith and is inclined upwardly and forwardly with its rear portion adapted to extend into the share-furrow up to the merging point of the ledge 12 with the rear edge of the fender plate. The front under-portion of the fender-plate is curved, as at 13, to provide a forward and upwardly curved continuation of the share 1, and serves for cutting weeds cross-wise of the path of the share. Thus constructed, the vertical fender-plate, together with the ledge 12 will prevent earth clods covering or burying young plants by the fender plate deflecting clods of earth delivered over the mold-board and the ledge 12 operating to compact or press into the share-furrow such clods of earth, which delivered over the mold-board would roll upon the young plants immediately behind the passing of the fender plate.

The cultivator-shovels are made in pairs by projecting a mold-board to the right and a mold-board to the left from a respective member of a pair of shares, and likewise, by flanging the members of a pair of fender-plates, one to the right and the other to the left, right and left fenders are produced.

The cultivator-shovels and fenders are each coincidently perforated for bolt couplings 14 by means of which said cultivator-shovels and fenders are coupled to a clamp 15, having an angled arm 16, which is coincidently pierced for such bolt coupling. The upper portion 17 of the clamp is in U form for adjustably embracing a standard 18 and each member of the U is provided with ears 19 which are arranged in opposite pairs and so pierced that a bolt 20 may be inserted through each pair of ears, immediately behind the standard to compress thereon the opposite clamp members and thereby adjustably secure the cultivator-shovel and fender to a cultivator-standard.

As shown in Figs. 3 to 6 inclusive, the share 1 and the mold-board 2 may be made integral and coupled with its fender to the clamp 15 and it is obvious that the fender may be detached and the shovel used without it.

In the modified form, shown in Figs. 7 and 8, the share 21 and the mold-board 22 may be a steel stamping, also right and left. In this construction, the share 21 and the mold-board 22 are jointly backed by a casting 23 which is riveted to the mold-board and adapted to bear against the junction of the share portion and the mold-board by conforming to the curvature of both, the share and the mold-board. The casting 23 is also provided with paired ears 24 which are pierced and so arranged that by means of bolts 25, the casting may be coupled to a coincidently pierced standard 26. The fender is secured to the share and to the cast-metal backing by means of bolts 27.

In Fig. 1 of the drawings is shown a cultivator A, having frame members 28 converging in the direction of draft of the cultivator, being each provided with standards which are variously adjustable as to height and spacing. Each front standard 29 has coupled thereto one of my shovels and fenders which in the position shown in Fig. 1 are adapted to be drawn closely along rows of young plants being arranged with their shares 1 next to the plants and the mold-boards outward of the respective shares. When a cultivator equipped with one of my right hand shovels B and one of my left hand shovels C, is drawn along the rows of young plants, the pair of shares, one to each side of a plant row, delineate the sub-soil in which the plants are rooted and preserve said sub-soil intact while loosening the top layer of earth about the young plants. The earth to the outside of shares being also subjected to an upheaving by the respective mold-boards, the fender plates operate to prevent clods of earth falling upon and covering the young plants and such clods of earth that would bury or cover the plants behind the passing of the vertical fender plates, are compacted and pressed into the share furrows by the respective ledges 12, and thus permitting the cultivation of the soil and the removal of weeds more closely to rows of young plants. The balance of the balk between opposite rows of plants is cultivated by shovels 30 of the usual form.

In Fig. 2, a cultivator is shown in which the right and the left cultivator-shovels are transposed and occupy each other's respective position relative to the row of plants, being also more separated, the interchanged moldboards are adapted to heap soil toward and against rows of older plants.

What I claim is:

1. The combination with a shovel blade, of a fender secured to the upper portion of the blade substantially in vertical alinement with its share; said fender being formed on its upper edge with a lateral ledge which is inclined forwardly.

2. The combination with a shovel blade, of a flat fender plate secured to one side of the blade substantially in vertical alinement with the blade share, said fender having its front face fashioned to extend upwardly and forwardly from the share to coöperate therewith to sever weeds, and having its upper edge formed with a forwardly inclined lateral ledge.

3. The combination with a cultivator shovel, of a fender plate detachably coupled to the upper edge of the shovel with its side substantially parallel with the shovel share and having a ledge on its upper edge which overhangs the shovel body and declines from its forward end rearwardly.

4. The combination with a cultivator shovel, of a plate fender detachably coupled to the upper portion of the shovel share with its front face fashioned to extend upwardly and forwardly from the cutting edge of the share and having its top formed with a ledge which projects partly over the shovel and declines rearwardly from the forward end of the plate with its rear portion curved downwardly.

5. The combination with a cultivator shovel, of a plate fender rising from the upper portion of the shovel share in line therewith, said fender being declined rearwardly with its rear portion adapted to extend into the shovel-furrow and has its upper edge formed with a ledge which overhangs the shovel and declines rearwardly with its rear portion curved downwardly, substantially as described.

6. The combination with a cultivator shovel, of a fender plate coupled to the upper portion of the share and having its front face curved upwardly and forwardly from the cutting edge of the share, as at 13, said plate also having its upper edge fashioned to form a ledge which extends over the shovel, declining from its forward end rearwardly, and having its rear portion curved downwardly, substantially as described.

In witness whereof, I have hereunto set my hand and seal this 12th day of December, 1908.

J HENRY BICKHARD. [L. S.]

Witnesses:
   CHAS. C. DAWSON,
   HARRIET WOODIN.